United States Patent [19]
Wilheim

[11] Patent Number: 4,776,048
[45] Date of Patent: Oct. 11, 1988

[54] HEAD CUSHION ELEMENT

[75] Inventor: Illbruck G. Wilheim, Leverkusen, Fed. Rep. of Germany

[73] Assignee: Irbit Research & Consulting AG, Fribourg, Switzerland

[21] Appl. No.: 118,181

[22] Filed: Nov. 6, 1987

[51] Int. Cl.[4] .............................................. A47G 9/00
[52] U.S. Cl. ............................................. 5/434; 5/448
[58] Field of Search ................... 5/434, 435, 440, 419, 5/448

[56] References Cited

U.S. PATENT DOCUMENTS

| | | | |
|---|---|---|---|
| 3,426,372 | 2/1969 | Enelow | 5/434 |
| 3,753,263 | 8/1973 | Willis | 5/434 |
| 3,905,057 | 9/1975 | Willis | 5/434 |
| 4,147,825 | 4/1979 | Talalay | 5/434 |
| 4,207,636 | 6/1980 | Ceriani | 5/434 |
| 4,242,767 | 1/1981 | McMullen | 5/434 |
| 4,247,961 | 2/1981 | Marsch | 5/434 |
| 4,508,044 | 4/1985 | Downey | 5/434 |
| 4,606,088 | 8/1986 | Michaelsen | 5/434 |

Primary Examiner—Reinaldo P. Machado
Attorney, Agent, or Firm—Martin A. Farber

[57] ABSTRACT

A head cushion element more especially for use in pickup trucks comprises a cushion core within a casing forming front and rear sides of the head cushion element. The casing furthermore is made of cellular resin and is formed in two parts. There is a connection flange joining the two said parts together and being rib-like in cross section. The flange is located adjacent to the rear side.

25 Claims, 3 Drawing Sheets

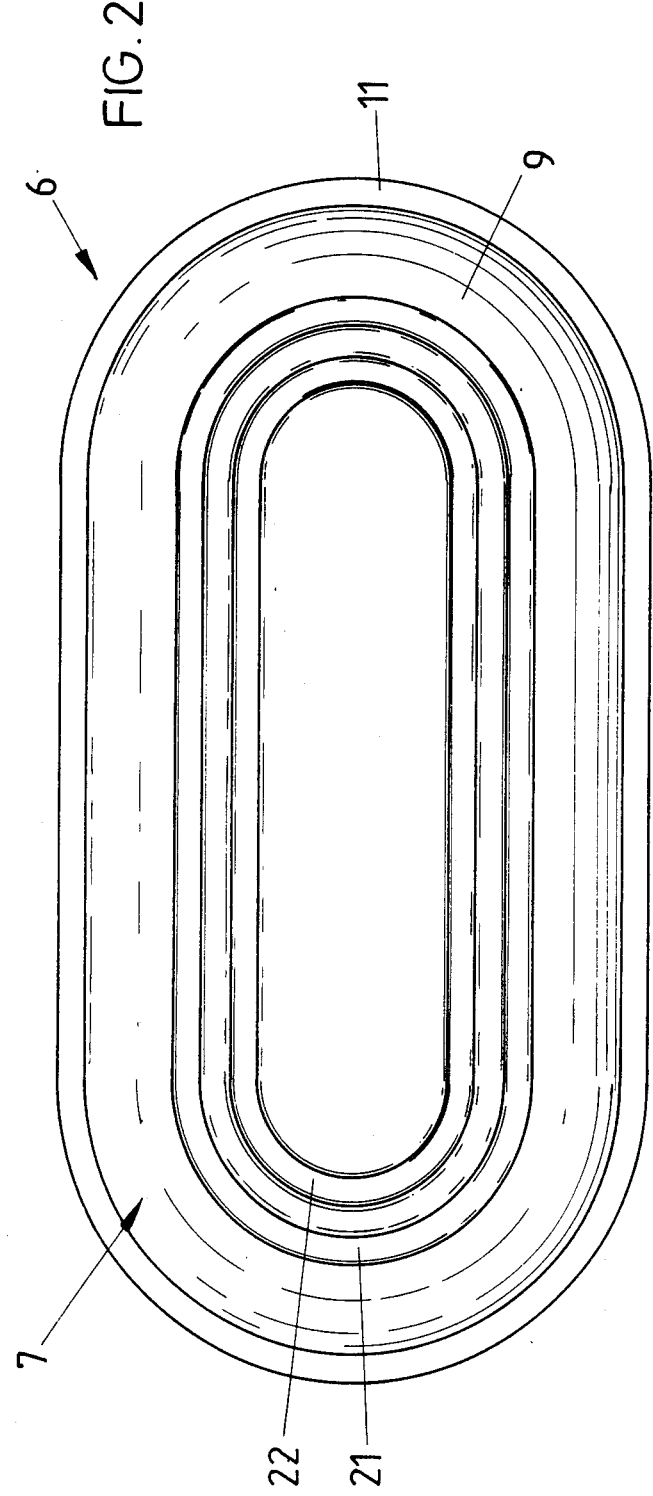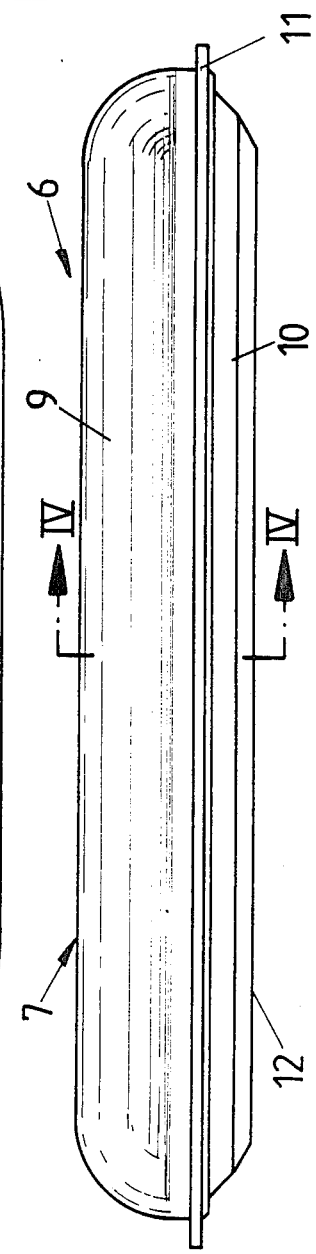

HEAD CUSHION ELEMENT

BACKGROUND OF THE INVENTION

The invention relates to a head cushion element, and more especially to a head cushion element for use in road vehicle bodies.

As a general rule head cushion elements comprise a cushion core consisting of soft material such as a cellular one surrounded by a casing of textile material, leather or plastic.

SHORT SUMMARY OF THE INVENTION

One object of the present invention is to devise a head cushion element of the type in question such that it is particularly suitable for attachment to the rear windows of pickup trucks.

A still further aim of the invention is to provide such a head cushion element that it is has optimum cushioning properties.

Yet another aim of the invention is to provide such a head cushion element which may be readily mounted.

In order to achieve these or other objects of the invention a head cushion element, which is more particularly suitable for attachment to rear windows of motor vehicle bodies, is characterized by comprising a cushion core surrounded by a casing which forms a front and a rear side, consists of cellular material and is made in two parts held together by a connection rim or flange which in cross section is rib-like and is offset towards the rear side so as to be arranged adjacent to it.

Such a design leads to a head cushion element of the type in question of unique utility. It is more particularly suitable for attachment to the rear windows of pickup trucks. The two-part casing is for its part also made of cellular material.

It is in this manner that in connection with the cushion core there is a unique protection against impacts, since the casing contributes to the cushioning function of the structure. Given a suitable selection of the material of the cushion core and of the casing, it is even possible to ensure a progressive characteristic combined with a relatively small overall height of the head cushion element. The arrangement of the connecting rim securing the two parts of the head cushion element together adjacent to the rear side means that the front casing may be fashioned in the form of a pot and will house a substantial proportion of the cushion core. Furthermore, the rim is near the attachement surface so that it does not cause any inconvenience. A further point is that it forms a characteristic feature of the structure so that it is at once possible to perceive how the head cushion element is to be correctly mounted on the rear window of a vehicle. It is for instance possible to attach the rear casing to the vehicle window by means of a burr or hook and loop fastener, one part of such fastener being secured to the window and the other part of the burr fastener being attached to the rear casing.

In accordance with a further feature of the invention which leads to a simplification and cheapening of manufacture, the front side of the casing is made of a skin-encased cellular polyester material. This skin represents the cover of the cushion and may be produced by heat treatment. Therefore no separate cushion cover is needed. The skin makes the head cushion element more hygienic inasfar as it prevents the penetration of moisture, dirt etc. into the casing to a substantial extent. It also leads to a more esthetic appearance of the head cushion element.

A progressive cushioning function or characteristic is due to the fact that the rear side of the casing consists of a polyester cellular material which has a greater hardness than the cellular material constituting the front side of the casing. This measure is thus helpful as regards providing secure attachment of the head element, since the rib-like rim is made stronger as a result; more particularly when detaching the head cushion element from the rear window it easy to grip the cushion at the rim or flange.

A particularly suitable design is one in which the cushion core consists of a polyether cellular material. It has been shown by tests that the cushioning effect is optimum if the bulk density is around 50 kg per cubic meter or 4 lbs per cubic foot. On fitting the three layers together by hot molding an account external shape is produced, the casing parts at least partly entering into an adhesive bond with the cushion core. The cushion core is thus very securely held in position.

The layers or plies of the head cushion element are to be made so thick that the cellular core has a thickness at least equal to the sum of the thicknesses of the two casing parts.

The cushioning properties are more especially optimum if the casing parts each have a thickness equal to between 8 and 15 mm.

This furthermore takes the fact into account that the cushion core has a thickness of around 30 to 40 mm.

The attachment surface of the head cushion element is rendered more rigid if the rear casing has a denser pore system in its outer part. This denser or more compact pore arrangement makes the structure more suitable for mounting the attachment means which is used between the head cushion element and the vehicle window.

The supporting function may be made more advantageous if the head cushion element is made oval or like the plan of a stadium or running track with two parallel sides joined by rounded ends. In the case of a single cushion it is then an advantage if there is a ratio of approximately 2 to 1 between the longitudinal axis and the transverse axis.

It is possible to have a thin rim to the head cushion element if the rim or flange consists of compacted cellular material of the upper and lower sides. This rim is produced on connecting the two casing parts. After connection the thickness of the rim will be substantially less that the initial wall thickness of the casing parts. It may be approximately between one third and one tenth, the third relating to the minimum initial wall thickness and the tenth relating to the maximum initial wall thickness.

It is an advantage in addition if the rim is spaced from the rear side by a distance approximately equal to the thickness of the casing. On the one hand the rim does not then cause any obstruction while on the other hand it is easy to clasp the rim in the hand if the head cushion element is to be removed.

The following detailed account describes one working example of the invention with reference to FIGS. 1 to 4.

LIST THE SEVERAL VIEWS OF THE DRAWINGS

FIG. 2 is a view from the front of the head cushion element.

FIG. 3 is a side view of the head cushion element.

DETAILED ACCOUNT OF WORKING EXAMPLES OF THE INVENTION

Figure 1:
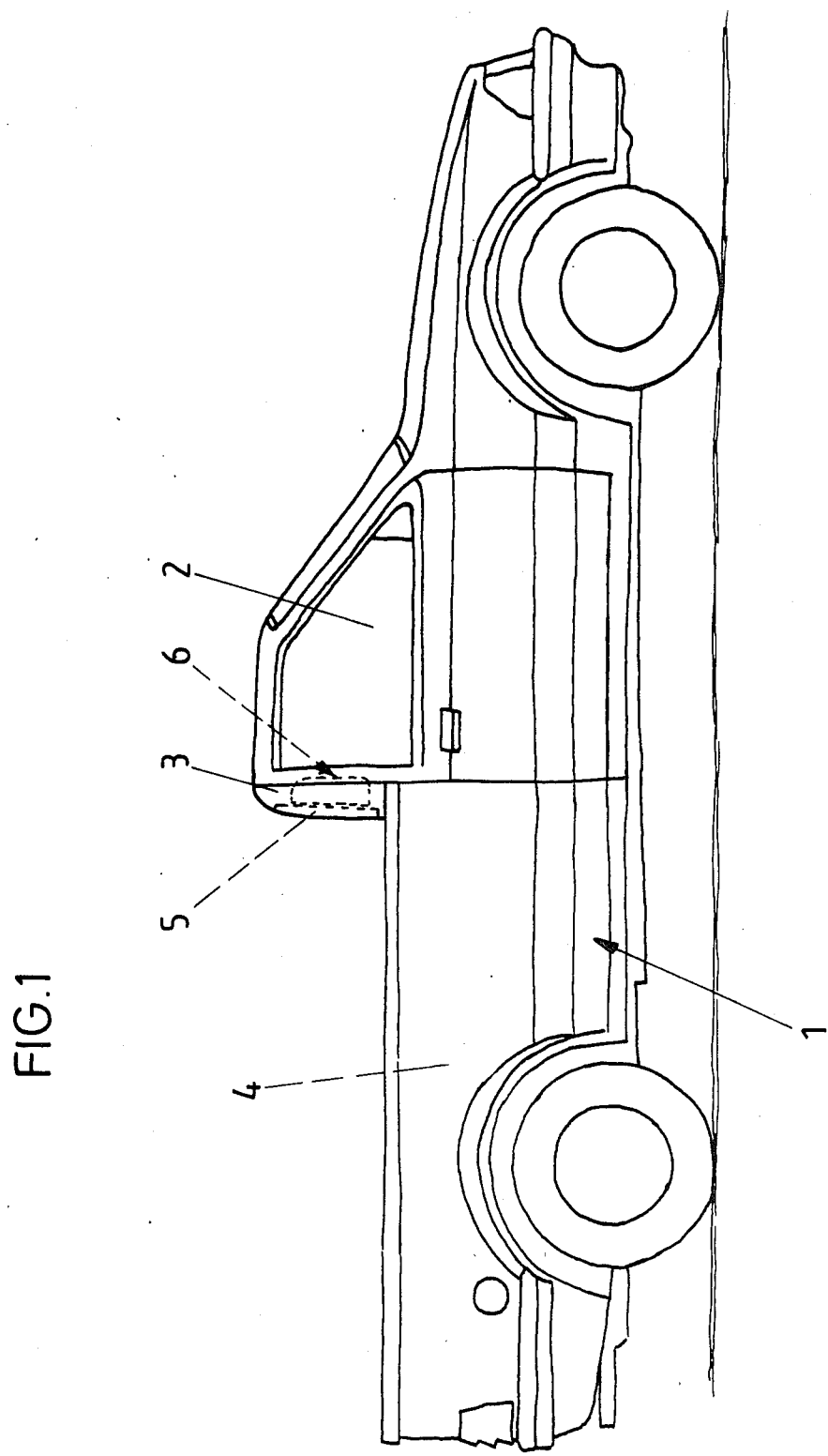
FIG. 1 shows a pickup vehicle equipped with a head cushion element in accordance with the invention.

The pickup vehicle, that is to say a light truck with a passenger car chassis, has a body generally referenced 1. The body defines a driver space 2 with a rear wall 3 in front of a load carrying stage 4. The rear wall 3 has a rear window 5 for the driver to look out to the back and which at the level of the driver's head bears a head cushion element 6.

The head cushion element 6 is in plan like a stadium with a ratio between the longitudinal axis and the transverse axis of about 2 to 1.

As regards details it will be seen that the head cushion element 6 possess a two-part casing 7 enclosing a cushion core 8. Both the casing parts 9 and 10 and also the cushion core 8 consist of cellular plastic. For the manufacture of the casing parts 9 and 10 polyester cellular material is used so that the rear casing part 10 has a greater hardness than the front casing part 9. On the other hand the cushion core 8 consists of a polyether cellular material with a bulk density of around 50 kg per cubic mater.

The oval-shaped cushion core 8 surrounded on all sides has a thickness x which at least equal to the sum of the thicknesses y and z of the two casing parts. In the present working example of the invention the casing parts 9 and 10 have thicknesses y and z of about 13 mm, while the thickness x of the cushion core is about 35 mm.

The three layers or plies for the casing parts and the cushion core are first cut out to size and then molded at a raised temperature to form the outer surface. The casing parts 9 and 10 are then held together by the surrounding rim or flange 11. The latter has a rib-like cross section and is arranged adjacent to the rear side 12 of the casing 10. It will be seen that the connecting rim 11 is spaced from the rear side 12 by a distance approximately equal to the thickness z of the casing 10. On fitting together the edge zones of the casing parts 9 and 10 they are compacted so that the rim or flange then has a thickness u of about 4 mm. On the other hand the length v of the edge 11 is approximately twice as large as the thickness u.

On fitting together the casing parts 9 and 10 with the cushion part 8 between them a casing side wall 14 is produced adjacent to the cushion core side wall 13. This side wall 14 merges with the compacted connecting wall 11. The two sections formed by the casing parts of the connecting rim or flange 11 become welded together owing to the heating and this leads to a permanent joint.

Figure 4:
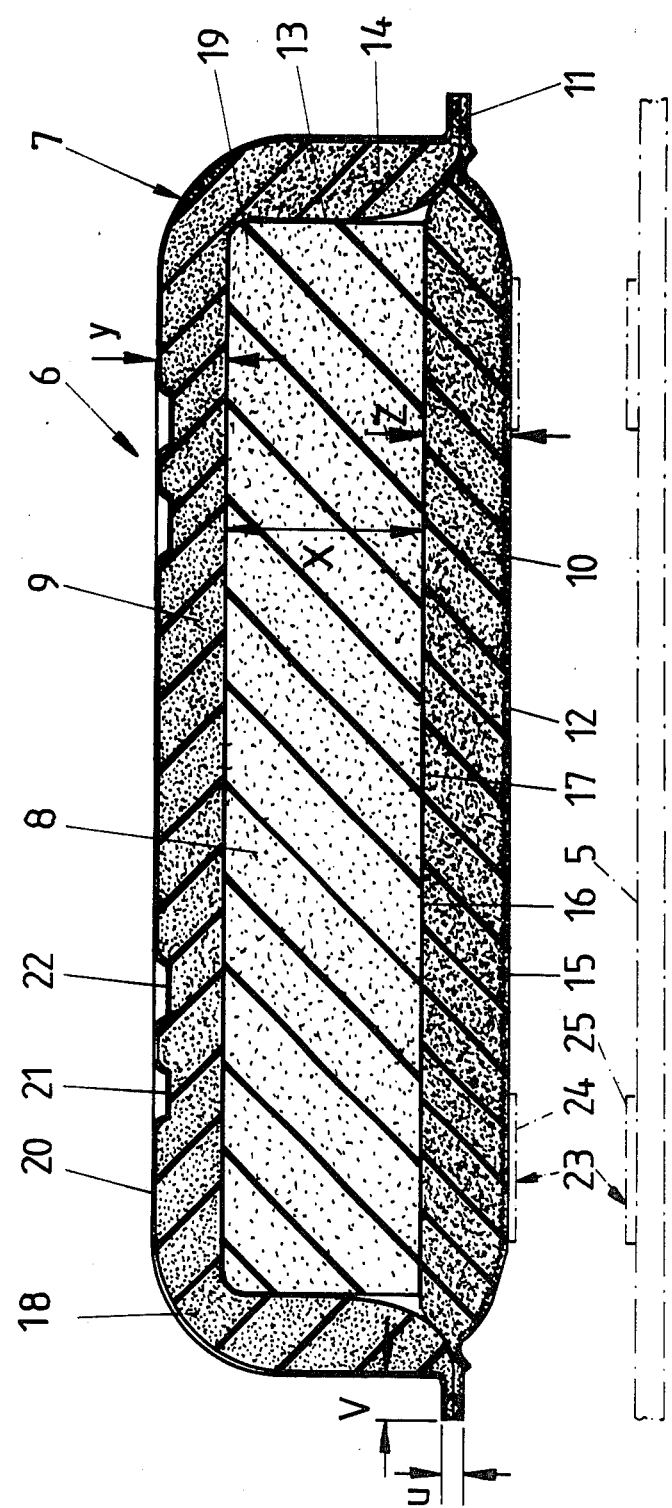
FIG. 4 is a section taken on the line IV—IV of FIG. 3 generally on a 1 to 1 scale.

It will be seen from FIG. 4 that the internal height of the casing part (generally having the form of a trough) is approximately equal to the thickness x of the cushion core 8.

FIG. 4 further indicates that the rear casing 10 has a denser pore system in its outer part 15, this involving a strengthening of the attachment surface of the head cushion element 6.

On fitting together the cellular layers and heating them the two inner face 16 and 17 of the cushion body 8 and of the rear casing 10 are fused and sweated or welded together over their full extent. Furthermore, the action of the heat causes fusion adjacent to the rounded transitional zone 18 between the casing part 9 and the corner part 19 of the cushion core 8 so that the latter is fixed in relation to the casing 7.

It is possible for the front side of the front casing 9 to be endowed with a integral cellular skin prior to the connection operation or during such operation, such skin being produced by the action of heat. This skin 20 is permeable to air yet substantially liquid tight. It therefore increases user-convenience and prevents the ingress of dirt and moisture into the material.

For the purpose of improving its appearance the front side may be provided with grooves in the form of a stadium.

For attachment of the head cushion element 6 on the rear window 5 of the vehicle a burr fastener 23 more especially as shown in FIG. 4 may be used. It comprises the two parts 24 and 25. The part 24 is attached to the back side 12, for example by bonding, whereas the other part 25 is attached to the window 5 in a similar manner. The attachment of the head cushion element 6 may be performed simply by pressing it in place so that the two halves of the burr fastener are united. For removal the rim 11 may be used, which is readily grasped and makes possible detachment from the rear window. This has to be done intentionally and there is no danger of the head cushion element being accendentally detached from the window 5.

All features mentioned in the specification and shown in the drawing are important for the invention, even if they are not expressly claimed.

What is claimed is:

1. A head cushion element comprising a cushion core, a casing surrounding said core and forming front and rear sides of the head cushion element, said casing furthermore being made of cellular resin and being formed in two parts, and a connecting rim joining the two said parts together, said rim being rib-like in cross section and being placed adjacent to the rear side.

2. The head cushion element as claimed in claim 1 adapted for attachment to the rear window of a motor vehicle.

3. The head cushion element as claimed in claim 1 wherein the casing includes a skin bearing cellular polyester material forming the front side of the casing.

4. The head cushion element as claimed in claim 3 wherein the casing includes a skin bearing cellular polyester material having a greater hardness than the material forming the front side of the casing.

5. The head cushion element as claimed in claim 1 wherein said cushion core consists of polyether cellular material.

6. The head cushion element as claimed in claim 1 wherein the cellular cushion core has thickness which is at least equal to the sum of the thicknesses of the two casing parts.

7. The head cushion element as claimed in claim 1 wherein the casing parts each have a thickness between 8 and 15 mm.

8. The head cushion element as claimed in claim 1 wherein said cushion core has a thickness of approximately 30 to approximately 40 mm.

9. The head cushion element as claimed in claim 1 wherein in a rear outer portion thereof said casing has a compacted pore system.

10. The head cushion element as claimed in claim 1 having in plan the form of a stadium with two parallel sides connected by rounded ends.

11. The head cushion element as claimed in claim 1 wherein said rim comprises compacted cellular material of upper and lower sides.

12. The head cushion element as claimed in claim 1 wherein the rim is spaced from the rear side of the head cushion element by a distance equal to the thickness of the casing.

13. A head cushion element comprising a cushion core, a casing surrounding said core and forming front and rear sides of the head cushion element, said casing furthermore being made of cellular resin and being formed in two parts, and a connecting rim joining the two said parts together, said rim being rib-like in cross section and being placed adjacent to the rear side, said core being formed of a polyether cellular material.

14. The head cushion element as claimed in claim 13 wherein said cushion of cellular material has a thickness at least equal to the sum of the thicknesses of the tow casing parts.

15. The head cushion element as claimed in claim 13 wherein the front side of the casing is polyester cellular material bearing a skin 16. The head cushion element as claimed in claim 13 wherein the rear side of the casing is fashioned of a polyester cellular material and such cellular material has a hardness greater than that of cellular material forming the front side of the casing.

17. The head cushion element as claimed in claim 13 wherein said core has a thickness of approximately 30 to approximately 40 mm.

18. A head cushion element comprising a cushion core, a casing surrounding said core and forming front and rear side of the head cushion element, said casing furthermore being made of cellular resin and being formed in two parts, and a connecting rim joining the two said parts togehter, said rim being rib-like in cross section and being placed adjacent to the rear side, said casing having a rear outer part which has a compacted pore system.

19. The head cushion element as claimed in claim 18 having in plan the form of a stadium with two parallel sides connected by rounded ends.

20. The head cushion element as claimed in claim 18 wherein the casing includes a skin bearing cellular polyester material forming the front side of the casing.

21. The head cushion element as claimed in claim 18 wherein the rear side of the casing consists of a cellular polyester material and such material has a greater hardness than the material forming the front side of the casing.

22. The head cushion element as claimed in claim 18 wherein said core is made of a polyether cellular material.

23. The head cushion element as claimed in claim 18 wherein said cellular cushion core has a thickness at least equal to the sum of the thicknesses of the two casing parts.

24. The head cushion element as claimed in claim 18 wherein the casing parts each have thicknesses equal to between 8 and 15 mm.

25. The head cushion element as claimed in claim 18 wherein said cushion core has a thickness between about 30 and about 40 mm.

* * * * *